United States Patent
French et al.

(10) Patent No.: US 8,324,603 B2
(45) Date of Patent: Dec. 4, 2012

(54) GALVANIC ISOLATION THAT INCORPORATES A TRANSFORMER WITH AN OPTICAL LINK AND THAT CAN BE INTEGRATED ONTO A SINGLE SEMICONDUCTOR SUBSTRATE

(75) Inventors: William French, San Jose, CA (US); Peter J. Hopper, San Jose, CA (US); Vladislav Vashchenko, Palo Alto, CA (US); Philipp Lindorfer, San Jose, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 290 days.

(21) Appl. No.: 12/862,136

(22) Filed: Aug. 24, 2010

(65) Prior Publication Data

US 2011/0174999 A1    Jul. 21, 2011

Related U.S. Application Data

(60) Provisional application No. 61/297,044, filed on Jan. 21, 2010, provisional application No. 61/297,451, filed on Feb. 8, 2010.

(51) Int. Cl.
  *G02B 27/00* (2006.01)
  *H01L 29/00* (2006.01)
(52) U.S. Cl. ............... 250/551; 250/214 R; 257/501
(58) Field of Classification Search ............ 250/551, 250/214 R, 208.1; 257/499, 500, 501, 506; 29/846
  See application file for complete search history.

(56) References Cited

U.S. PATENT DOCUMENTS

| | | | | |
|---|---|---|---|---|
| 6,147,393 A | * | 11/2000 | Zommer | 257/501 |
| 7,719,305 B2 | * | 5/2010 | Chen | 326/21 |
| 2010/0144116 A1 | * | 6/2010 | Hopper et al. | 438/427 |

* cited by examiner

*Primary Examiner* — Kevin Pyo
(74) *Attorney, Agent, or Firm* — Wade J. Brady, III; Frederick J. Telecky, Jr.

(57) ABSTRACT

Methods and structures provide galvanic isolation for electrical systems using a wide oxide filled trench, and that allows power across the system divide with a transformer, and that transmits data at a high baud rate using an optical link. The system solution allows the integration of all of these elements onto a single semiconductor substrate in contrast to currently available galvanic isolation systems that require multiple individual silicon die that are connected by wire bonds and are relatively slow.

18 Claims, 5 Drawing Sheets

GALVANIC ISOLATION THAT INCORPORATES A TRANSFORMER WITH AN OPTICAL LINK AND THAT CAN BE INTEGRATED ONTO A SINGLE SEMICONDUCTOR SUBSTRATE

RELATED APPLICATIONS

This application claims the benefit of U.S. Provisional Application No. 61/297,044, filed on Jan. 21, 2010. Provisional Application No. 61/297,044 is hereby incorporated by reference herein in its entirety.

This application also claims the benefit of U.S. Provisional Application No. 61/297,451, filed on Feb. 8, 2010. Provisional Application No. 61/297,451 is hereby incorporated by reference herein in its entirety.

This application is related to co-pending and commonly-assigned U.S. application Ser. No. 12/315,934, filed on Dec. 8, 2008, and titled "Method of Forming High Lateral Voltage Isolation Structure Involving Two Separate Trench Fills." application Ser. No. 12/315,934 is hereby incorporated by reference herein in its entirety.

This application is also related to co-pending and commonly-assigned U.S. application Ser. No. 12/584,904, filed on Sep. 15, 2009, and titled "High-Speed Avalanche Light Emitting Diode (ALED) and Related Apparatus and Method." application Ser. No. 12/584,904 is hereby incorporated by reference herein in its entirety.

FIELD OF THE DISCLOSURE

This disclosure relates to galvanic isolation in an electrical system and, in particular, to a galvanic isolation technique that combines optical coupling with transformer and trench technology to provide a galvanic isolation system that can be integrated onto a single semiconductor substrate.

BACKGROUND

Any electrical system that includes systems that have different ground references or that have the capability to produce current surges is required to incorporate galvanic isolation to protect both the system and the user.

There are a number of solutions available that offer galvanic isolation between two electrical systems. One such solution is a multi-die approach that includes a transformer connected between the two systems. Data are transferred across the transformer via magnetic fields by utilizing the first system to apply short pulses on one side; these pulses are transmitted across the transformer and the data are decoded on the other side by the second system. Another solution is similar to that just described, but uses a capacitor to isolate two electrical systems instead of a transformer. Yet another solution utilizes optical coupling whereby a light emitting diode (LED) in a first system emits light and a photodiode in the second system detects the light and generates electrical current; the LED and photodiode are typically built from III-V or II-VI semiconductor materials such as GaAs and InGaAs, with the LED and the photodiode being physically distinct units.

Currently available galvanic isolation solutions require multiple individual semiconductor die that are connected by wire bonds and are relatively slow. There is a need for a high speed galvanic isolation system that allows for the integration of all of the system elements onto a single semiconductor substrate.

SUMMARY

Disclosed embodiments provide galvanic isolation methods and structures for two electrical systems using a wide dielectric galvanic isolation barrier, and that allow power to be provided across the system divide utilizing a transformer, and that transmit data at a high baud rate using an optical link. The system solution allows the integration of all of these elements onto a single semiconductor substrate.

Disclosed embodiments provide a system for galvanic isolation of a first electrical system that is formed in a semiconductor substrate and that includes first electrical circuitry that operates at a first voltage level and a second electrical system that is formed in the semiconductor substrate and that includes second circuitry that operates at a second voltage level that is different than the first voltage level. The system comprises: a dielectric galvanic isolation barrier formed in the semiconductor substrate between the first electrical system and the second electrical system; one or more optical emitters formed in the semiconductor substrate as part of the first electrical system and that generates light pulses that are transmitted through the dielectric galvanic isolation barrier to the second electrical system; one or more optical receivers formed in the semiconductor substrate as part of the second electrical system and adapted to receive light pulses transmitted through the dielectric galvanic isolation barrier; a clock generator formed in the semiconductor substrate as part of the first electrical system and that provides a clock signal to the one or more optical emitters to define the light pulses generated by the optical emitters; power circuitry formed in the semiconductor substrate as part of the first electrical system and that provides a power signal; and a transformer structure formed on the semiconductor substrate and adapted to transmit the clock signal and the power signal from the first electrical system to the second electrical system.

Disclosed embodiments provide a method for providing galvanic isolation in a system that includes a first electrical system formed in a semiconductor substrate, the first electrical system including first electrical circuitry that operates at a first voltage level, and a second electrical system formed in the semiconductor substrate, the second electrical system including second electrical circuitry that operates at a second voltage level that is different than the first voltage level. The methods comprises: forming a dielectric galvanic isolation barrier in the semiconductor substrate between the first electrical system and the second electrical system; forming one or more optical emitters in the semiconductor substrate as part of the first electrical system, the one or more optical emitters being operable to generate light pulses that are transmitted through the dielectric galvanic isolation barrier to the second electrical system; forming one or more optical receivers in the semiconductor substrate as part of the second electrical system, the one or more optical receivers being operable to receive the light pulses transmitted through the dielectric galvanic isolation barrier; forming a clock generator in the semiconductor substrate as part of the first electrical system, the clock generator being operable to provide a clock signal to the one or more optical emitters to define the light pulses generated by the one or more optical emitters; forming power circuitry in the semiconductor substrate as part of the first electrical system, the power circuitry being operable to provide a power signal; and forming a transformer structure on the semiconductor substrate, the transformer structure being adapted to transmit the clock signal and the power signal from the first electrical system to the second electrical system.

Features and advantages of the various aspects of the disclosed subject matter will be more fully understood and appreciated upon consideration of the following detailed description and the accompanying drawings, which set forth illustrative embodiments.

DETAILED DESCRIPTION

Figure 1:
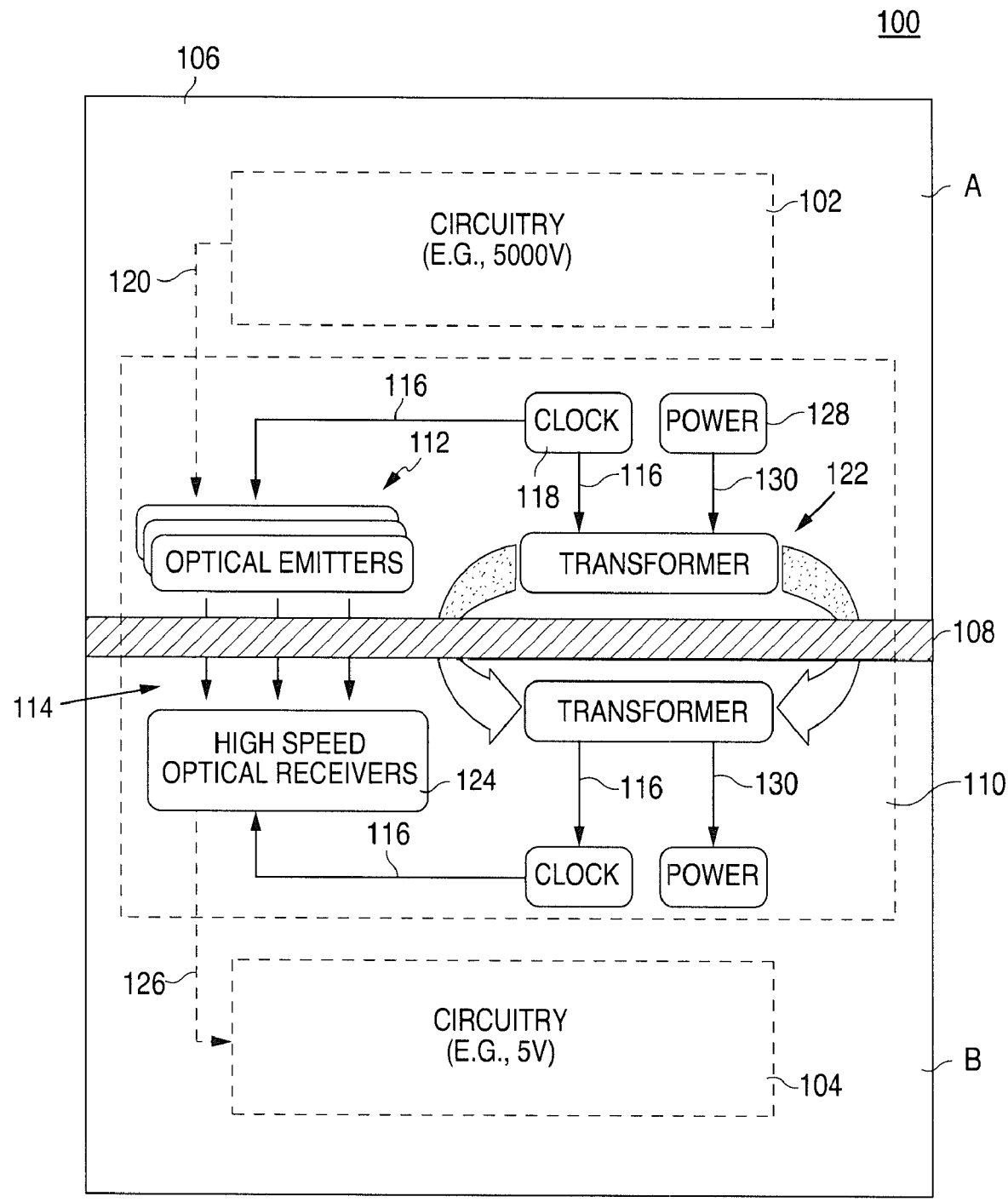
FIG. 1 is a block diagram illustrating an embodiment of a single-chip galvanic isolation system.

FIG. 1 shows a system 100 that includes two electrical systems: a first electrical system A that includes first electrical circuitry 102 that operates at a first voltage level (e.g., 5000V) and a second electrical system B that includes second electrical circuitry 104 that operates at a second voltage level that is different than the first voltage level (e.g., 5V). Both the first electrical circuitry 102 and the second electrical circuitry 104 are formed in a single semiconductor substrate (e.g., silicon) 106 and separated by a dielectric galvanic isolation barrier 108, e.g. silicon dioxide, that is formed in the semiconductor substrate 106.

FIG. 1 also shows a galvanic isolation system 110 that is formed in the semiconductor substrate 106. In addition to the dielectric galvanic isolation barrier 108, the galvanic isolation system 110 includes one or more optical emitters 112 that are formed in the semiconductor substrate 106 as part of the first electrical system A. The one or more optical emitters 112 generate light pulses 114 that are defined by the frequency of a clock signal 116 that is generated by a clock generator 118 that is also formed in the semiconductor substrate 106 as part of the first electrical system A. The light pulses 114 that are generated by the optical emitters 112, and which may correspond to data output signals 120 from the first electrical circuitry 102, are transmitted across the dielectric galvanic isolation barrier 108 from the first electrical system A to the second electrical system B. The clock signal 116 is also transmitted across a transformer structure 122 that is formed on the semiconductor substrate 106 to the second electrical system B. As shown in FIG. 1, one or more high speed optical receivers 124 formed in the semiconductor substrate 106 as part of the second electrical system B detect the transmitted light pulses which are converted into current and amplified by sense circuitry (not shown) in the conventional manner, and provided to the second electrical circuitry 104 as data input signals 126. The clock signal 116 is used as a refresh signal to the optical receivers 124 to both control timing and increase the speed. As further shown in FIG. 1, power circuitry 128 formed in the semiconductor substrate 106 as part of the first electrical system A provides a power signal 130 that is transmitted by the transformer structure 122 from the first electrical system A to the second electrical system B. Thus, the galvanic isolation system 110 enables high speed data communication across the galvanic isolation barrier 108 while at the same time allowing integration of all of the elements of the galvanic isolation system onto a single semiconductor substrate.

Figure 2:
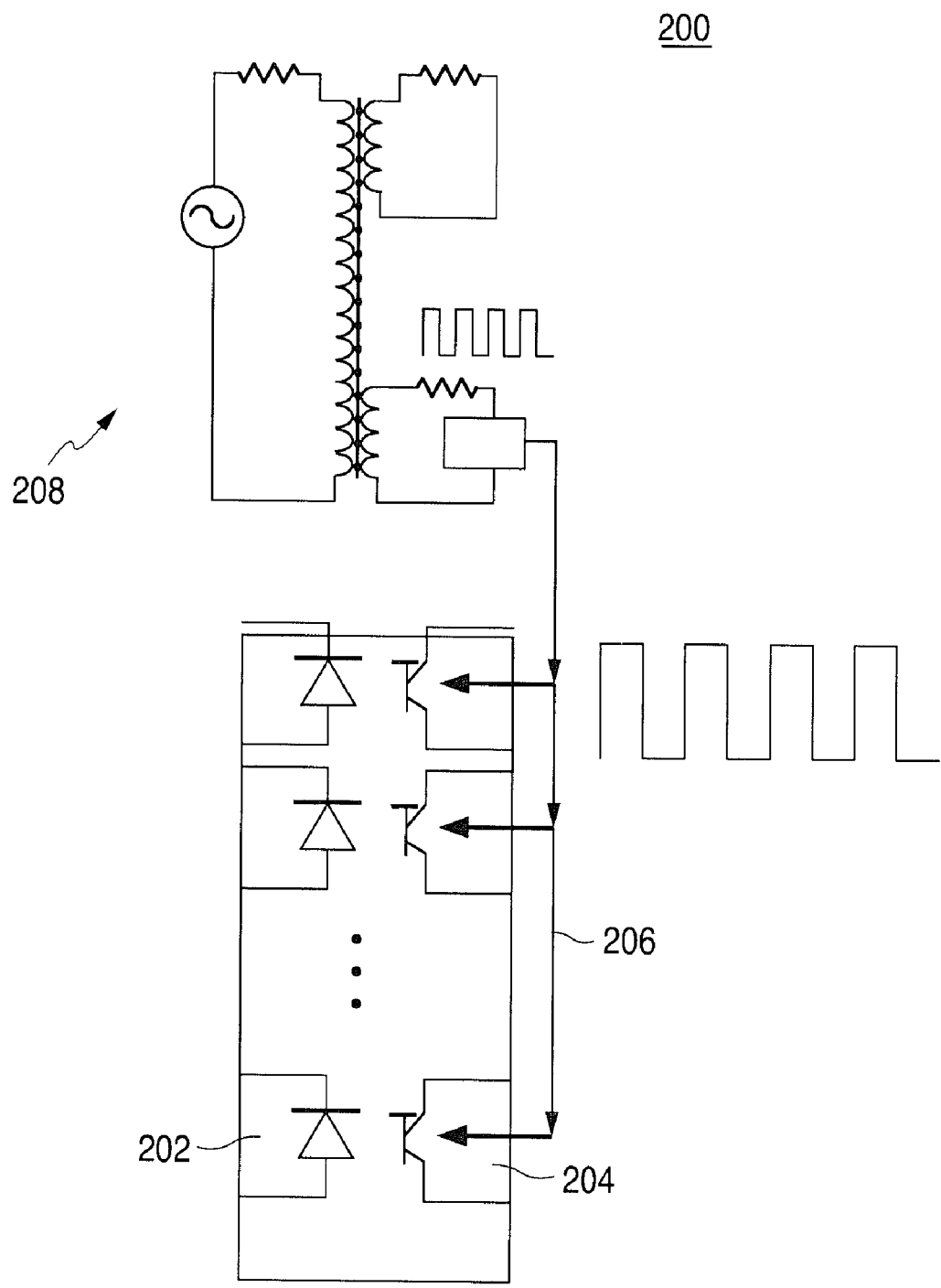
FIG. 2 is a schematic diagram illustrating an embodiment of a single-chip galvanic isolation system.

FIG. 2 provides a schematic representation of an embodiment of a galvanic isolation system 200 having multi-channel capability. As shown in FIG. 2, data is transmitted from a plurality of silicon LEDs 202 to a corresponding plurality of silicon photodiodes 204. The silicon photodiodes 204 incorporate a reset feature using the high frequency clock signal 206 that is tapped off the main transformer 208. This is the data rate. The reset feature flushes carriers from the photodiodes 204, thereby increasing their operating data rate. As further shown in FIG. 2, power is transmitted across the transformer 208 using a resonant LC system at high frequency, e.g., 500 MHz to several GHz. Power is extracted across the transformer 208 and is, therefore, isolated.

Element of the FIG. 1 and FIG. 2 embodiments will now be described in greater detail.

Optical Emitters

Light emitting diodes (LEDs), created in silicon, may be used to generate light pulses 114 through a process called electro-luminescence. Details regarding embodiments of such LED devices are provided in above-cited Related application Ser. No. 12/584,904.

Figure 3A:
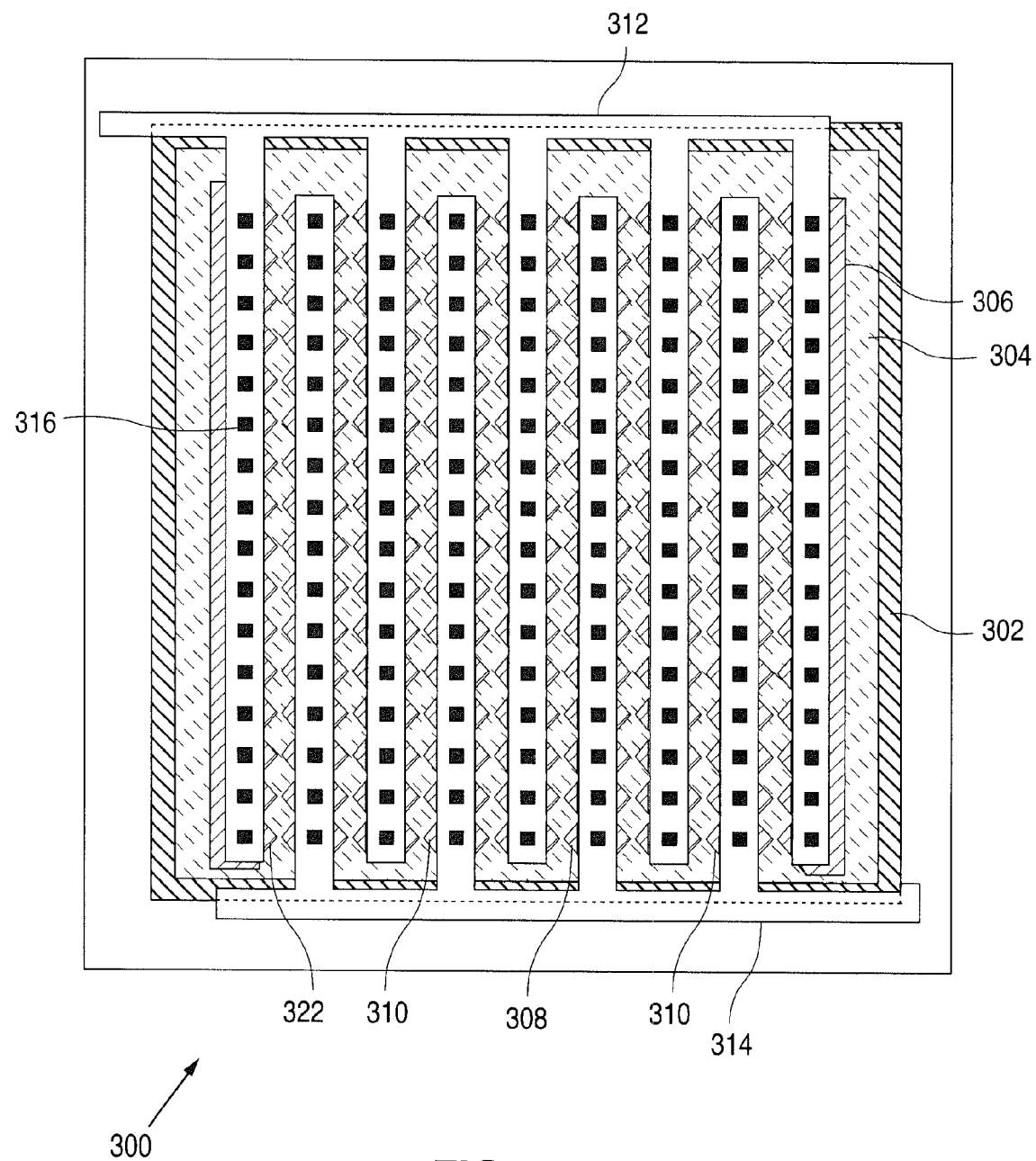
FIGS. 3A and 3B illustrate an embodiment of an avalanche light emitting diode (ALED).
Figure 3B:
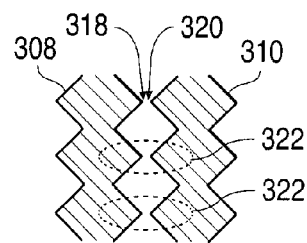

Referring to FIGS. 3A and 3B, application Ser. No. 12/584,904 discloses embodiments of an avalanche light emitting diode (ALED) 300 formed in a semiconductor substrate 302, such as, for example, a silicon substrate or a gallium arsenide layer grown over a silicon substrate. An isolation ring 304 is formed within the substrate 302 to isolate additional structures that may be formed in the substrate 302 inside the isolation ring 304. The isolation ring 304 may be a p+ ring that is formed utilizing multiple deep trenches formed in the substrate 302. A p-type or n-type buried layer 306 is formed in the substrate 302 inside the isolation ring 304. Various doped regions are formed in the substrate 302 inside the isolation ring 304 over the buried layer 306. In the illustrated embodiment, the doped regions include doped regions 308 that are interleaved with doped regions 310. The doped regions 308 and 310 have different dopant types. For example, doped regions 308 could be doped with P+ dopant and doped regions 310 could be doped with N+ dopant. In the illustrated embodiment, doped regions 308 and 310 are elongated regions that are arranged in generally vertical columns, with doped regions 108 being interleaved with doped regions 310. A first polysilicon electrode 312 is electrically coupled to the doped regions 308 and a second polysilicon electrode 314 is electrically coupled to the doped regions 310. Electrodes 312 and 314 include fingers that extend over the doped regions 308 and 310, respectively. Vias 316 provide electrical connection between the electrodes 312 and 314 and the respective doped regions 308 and 310.

As shown in FIG. 3B, the doped regions 308 and 310 are configured such that a tip 318 of a doped region 308 is generally positioned near a tip of a doped region 310. Each of the tips 318, 320 is positioned at a point where two generally straight edges of a doped region meet. In the disclosed embodiment, a tip 318 of a doped region 308 represents the closest portion of that doped region 308 to a tip 310 of an adjacent doped region 310 in a local area or vice versa. The tips 318 and 320 may be separated by a distance of, for example, 0.05-0.15 µm. In this arrangement, the doped regions 308 and 310 are used to form multiple P-I-N structures, which are referred to as filaments 322. The intrinsic or "I" regions of the filaments 322 represent lightly-doped regions of the substrate 302 between the doped regions 308 and 310. Each filament represents an area where light can be generated when suitable voltages are applied to the electrodes 312 and 314.

Further details regarding embodiments of ALEDs may be obtained by reference to application Ser. No. 12/584,904.

Dielectric Galvanic Isolation Barrier

As discussed above, the one or more optical emitters, such as the ALEDS discussed above, are formed in the semiconductor substrate 106 as part of the first electrical system A and emit light pulses. This light is directed across a dielectric galvanic isolation barrier 108 to the second electrical system B, as shown in FIG. 1.

In some embodiments, the dielectric galvanic isolation region 108 has two parts; a wide oxide filled trench created form the topside of the semiconductor substrate 106 and a backside trench. The topside oxide filled trench needs to be wide enough to ensure that it can handle a high voltage determined from the galvanic isolation specification. As discussed above, for individual components, this could be ~5 kV, which would require a trench that is approximately 15 um wide. Standard trench fill process technology is not capable of filing a trench this wide with silicon oxide in a useable manner. Details regarding a method for forming an embodiment of a wide topside isolation trench are provided in above-cited Related application Ser. No. 12/315,934.

application Ser. No. 12/315,934 discloses embodiments of high lateral voltage isolation structures and methods of forming such structures. According to methods disclosed therein, at least two trenches are formed in the topside of a semiconductor substrate around an active region, dielectric material (e.g., silicon oxide) is deposited in the trenches and any semiconductor material between the trenches is removed to define at least one additional trench. The initial trenches are typically formed in a manner known in the art, which may involve depositing on oxide-nitride stack to act as a hard mask, depositing photoresist over the hard mask, imaging the photoresist and then selectively etching the hard mask. Thereafter, the remaining photoresist is stripped away and the hard mask is used as a mask in etching the silicon to define the trenches. The etching of the silicon may be performed using a plasma etch that selectively etches silicon over oxide and nitride. The initial trenches are preferably etched down to a SOI layer and are typically 6 μm wide. The initial trenches may then be filled by growing a trench sidewall oxide and thereafter depositing dielectric (e.g., silicon dioxide) into the trench using chemical vapor deposition (CVD). Once the dielectric is deposited in the initial trenches, the dielectric material extending above the trenches is planaraized, e.g., by chemical mechanical polishing (CMP). Any remaining nitride hard mask material may then be removed using a nitride etch. The semiconductor material between the initial trenches is then removed by a masking and etching technique, which may include depositing a photoresist, imaging the photoresist and etching away at least the portion of the nitride-oxide hard mask that covers the semiconductor material that is to be removed, whereafter the photoresist is stripped away. The exposed semiconductor material may then be etched away utilizing a silicon etch, preferably down to the SOI layer to define at least one additional trench. The at least one additional trench may then be filled with dielectric (e.g., silicon dioxide) as part of a second CVD trench fill, thereby filling the region between the initial trenches to define one combined, wide trench. The dielectric material extending above the one or more additional trenches is typically planarized, e.g. by CMP. The semiconductor substrate 102 may therefore include a dielectric filled topside trench that is, for example, more than 15 μm wide.

Figure 4:
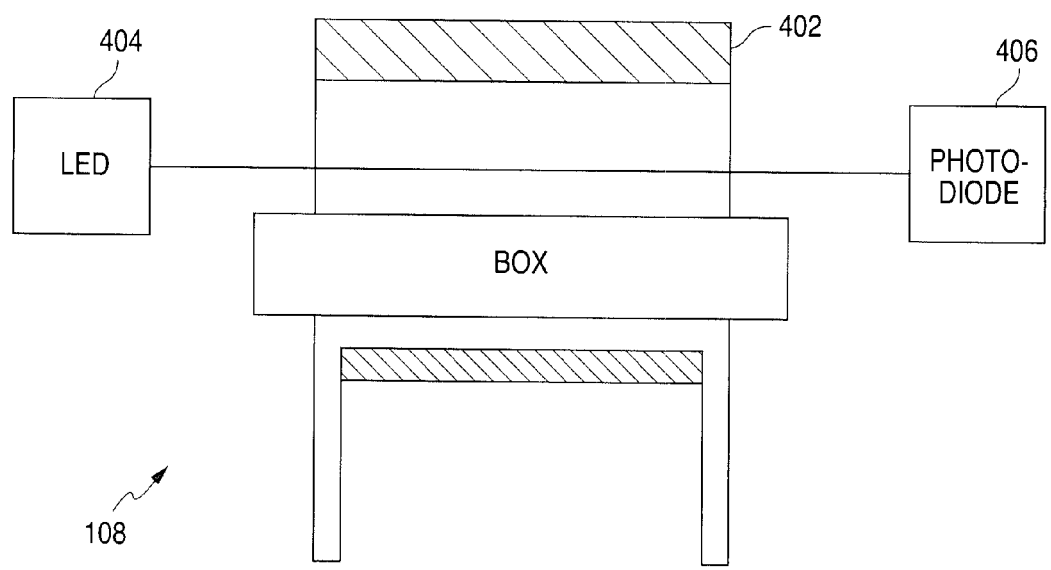
FIG. 4 is a cross section drawing illustrating light transmission through a dielectric galvanic isolation barrier.

As shown in FIG. 4, the topside wide trench portion of the dielectric galvanic isolation barrier 108 is surrounded by metal 402 in order to direct as much of the light as possible that is generated by the optical emitters (e.g., LEDs) 404 in the direction of the optical receivers (photodiodes) 406. Silicon dioxide is transparent to light so there should be minimal optical loss in the topside trench. As further shown in FIG. 4, the dielectric galvanic isolation barrier 108 also includes a backside trench 408 that is filled with dielectric material (e.g., SU8).

Optical Receivers

As shown in FIG. 4, on System B, the light from the LED crosses into a silicon photodiode 406 that acts as the optical receiver. The light within the photodiode generates electron-hole pairs which are then swept out of the device to sense circuitry. By modulating the LED power, it is therefore possible to transmit data across dielectric galvanic isolation barrier 108 to the photodiode receiver 406. The signal from the photodiode 406 can be amplified and the data extracted and provided to the electrical circuitry 104 of system B (FIG. 1).

In a system B embodiment, by placing separate photodiodes radiating out from the LED, it is possible to detect different wavelengths of light. This is possible because light has an absorption coefficient that is dependent on wavelength. Longer wavelengths (e.g. green) will be detected further away compared with shorter wavelengths (e.g. red) which will be absorbed closer to the LED. By creating a series of LEDs, a spectrum of wavelengths may be detected.

Figure 5:
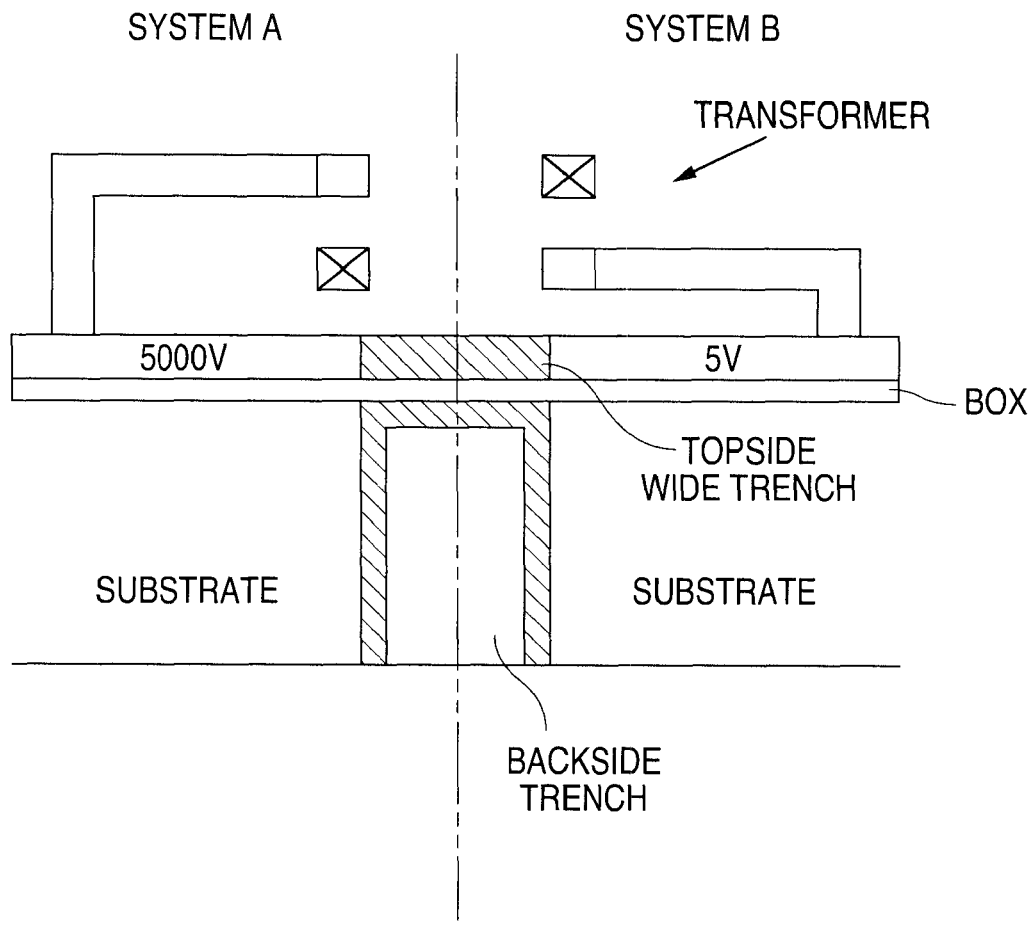
FIG. 5 is a cross section drawing illustrating an embodiment of a galvanic isolation transformer integrated into a single semiconductor substrate.

As stated above, the power for system B can be obtained from System A in accordance with galvanic isolation. A transformer may be used to pass power across from system A to the system B, as shown in FIG. 5. The transformer is designed to give high voltage protection by using thick inter-layer dielectrics. With a two layer Cu design of then type shown in the FIG. 5 embodiment, the resistance can be reduced significantly and thereby give a high Q value at a high frequency (an example of this is Q ~30 at 400 MHz). With such a high Q transformer, it is possible to design a resonant circuit that will allow power to be moved from system A to system B. By using a high frequency e.g. 400 MHz, the transformer size can be scaled down and thereby allow integration into a silicon system.

When a light pulse is applied to a photodiode, carriers are generated very quickly (on the order of <1 ns). However, when the light pulse is switched off, the photodiode requires a certain time to return to its off state. Typical times for this are in the >1 us timescale for silicon devices and about 10-100× less in GaAs like devices. This is the limiting factor in the speed of the system and why opto-couplers are limited to only 1-1-0 MBps speeds. As stated above, in an embodiment of the invention, a refresh pulse is applied to the photodiode. This refresh pulse turns the diode on for a very short period of time, e.g. <1 ns, which is enough to return the photodiode to its original state. This method allows the photodiode to operate in the GHz regime and >100 Mbps for data transfer. The problem has been linking the clock for the refresh to the data transmitted by the LED. In an embodiment of the invention, the clock is transmitted across a transformer (or coupled inductor), but not necessarily the same transformer used for the resonant power transmission.

It should be understood that the particular embodiments of the invention described above have been provided by way of example and that other modifications may occur to those skilled in the art without departing from the scope of the invention as expressed in the appended claims and their equivalents.

What is claimed is:

1. A system for galvanic isolation of a first electrical system formed in a semiconductor substrate and that includes first electrical circuitry that operates at a first voltage level and a second electrical system formed in the semiconductor substrate and that includes second electrical circuitry that operates at a second voltage level that is different than the first voltage level, the system comprising:
- a dielectric galvanic isolation barrier formed in the semiconductor substrate between the first electrical system and the second electrical system;
- one or more optical emitters formed in the semiconductor substrate as part of the first electrical system and that generate light pulses that are transmitted through the dielectric galvanic isolation barrier to the second electrical system;
- one or more optical receivers formed in the semiconductor substrate as part of the second electrical system and adapted to receive the light pulses transmitted through the dielectric galvanic isolation barrier;
- a clock generator formed in the semiconductor substrate as part of the first electrical system and that provides a clock signal to the one or more optical emitters to define the light pulses generated by the one or more optical emitters;
- power circuitry formed in the semiconductor substrate as part of the first electrical system and that provides a power signal; and
- a transformer structure formed on the semiconductor substrate and adapted to transmit the clock signal and the power signal from the first electrical system to the second electrical system.

2. The system of claim 1, wherein the first voltage level is greater than the second voltage level.

3. The system of claim 2, wherein the first voltage level is about 5000V and the second voltage level is about 5V.

4. The system of claim 1, wherein the semiconductor substrate comprises silicon.

5. The system of claim 4, wherein the dielectric galvanic isolation barrier comprises silicon oxide.

6. The system of claim 1, wherein the one or more optical emitters comprise light emitting diodes (LEDs).

7. The system of claim 6, wherein the one or more light emitting diodes comprise avalanche LEDs (ALEDs).

8. The system of claim 1, wherein the one or more optical receivers comprise silicon photodiodes.

9. The system of claim 1, wherein the transformer structure comprises a first transformer for transmitting the clock signal from the first electrical system to the second electrical system and a second transformer for transmitting the power signal from the first electrical system to the second electrical system.

10. A method for providing galvanic isolation in a system that includes a first electrical system formed in a semiconductor substrate and that includes first electrical circuitry that operates at a first voltage level and a second electrical system formed in the semiconductor substrate and that includes second electrical circuitry that operates at a second voltage level that is different than the first voltage level, the method comprising:
- forming a dielectric galvanic isolation barrier in the semiconductor substrate between the first electrical system and the second electrical system;
- forming one or more optical emitters in the semiconductor substrate as part of the first electrical system, the one or more optical emitters being operable to generate light pulses that are transmitted through the dielectric galvanic isolation barrier to the second electrical system;
- forming one or more optical receivers in the semiconductor substrate as part of the second electrical system, the one or more optical receivers being operable to receive the light pulses transmitted through the dielectric galvanic isolation barrier;
- forming a clock generator in the semiconductor substrate as part of the first electrical system, the clock generator being operable to provide a clock signal to the one or more optical emitters to define the light pulses generated by the one or more optical emitters;
- forming power circuitry in the semiconductor substrate as part of the first electrical system, the power circuitry being operable to provide a power signal; and
- forming a transformer structure on the semiconductor substrate, the transformer structure being adapted to transmit the clock signal and the power signal from the first electrical system to the second electrical system.

11. The method of claim 8, wherein the first voltage level is greater than the second voltage level.

12. The method of claim 9, wherein the first voltage level is about 5000V and the second voltage level is about 5V.

13. The method of claim 8, wherein the semiconductor substrate comprises silicon.

14. The method of claim 11, wherein the dielectric galvanic isolation barrier comprises silicon oxide.

15. The method of claim 8, wherein the one or more optical emitters comprise light emitting diodes (LEDs).

16. The method of claim 13, wherein the one or more light emitting diodes comprise avalanche LEDs (ALEDs).

17. The method of claim 10, wherein the one or more optical receivers comprise silicon photodiodes.

18. The method of claim 10, wherein the step of forming a transformer structure comprises forming a first transformer for transmitting the clock signal from the first electrical system to the second electrical system and forming a second transformer for transmitting the power signal from the first electrical system to the second electrical system.

* * * * *